(12) United States Patent
Koltick et al.

(10) Patent No.: US 7,732,772 B1
(45) Date of Patent: Jun. 8, 2010

(54) SYSTEM AND METHOD FOR DETECTING EXPLOSIVE MATERIALS

(75) Inventors: David S. Koltick, Lafayette, IN (US);
Yeong E. Kim, West Lafayette, IN (US);
Jayson K. Bopp, Fishers, IN (US);
Joseph C. Deno, Noblesville, IN (US);
Paul G. Jones, Plainfield, IN (US)

(73) Assignees: Raytheon Company, Waltham, MA (US); Purdue Research Foundation, West Lafayette, IN (US)

( * ) Notice: Subject to any disclaimer, the term of this patent is extended or adjusted under 35 U.S.C. 154(b) by 222 days.

(21) Appl. No.: 11/847,117

(22) Filed: Aug. 29, 2007

(51) Int. Cl.
*G01T 1/36* (2006.01)
(52) U.S. Cl. .............. 250/358.1; 250/370.05; 376/159; 376/166
(58) Field of Classification Search .............. 250/358.1, 250/370.05, 390.01–390.07; 376/159, 166
See application file for complete search history.

(56) References Cited

U.S. PATENT DOCUMENTS

| | | | | |
|---|---|---|---|---|
| 4,947,045 A | * | 8/1990 | Birks et al. | 250/360.1 |
| 6,791,089 B1 | * | 9/2004 | Caffrey et al. | 250/358.1 |
| 2001/0046274 A1 | | 11/2001 | Craig et al. | 376/154 |
| 2003/0165212 A1 | | 9/2003 | Maglich | 376/156 |
| 2003/0165213 A1 | | 9/2003 | Maglich | 376/159 |
| 2006/0284094 A1 | * | 12/2006 | Inbar | 250/359.1 |

OTHER PUBLICATIONS

Cooper, et al.; "*Time-sensitive search for chemical agents in γ-ray spectra*;" Nuclear Instruments and Methods in Physics Research A.; Elseview Science B.V.; pp. 490-493, 2003.
Koltick, David S.; "*Signal searching in return spectra and decision making using minimal integration time*;" Nuclear Instruments and Methods in Physics Research A; Elseview Science B.V., pp. 338-342, 2003.

* cited by examiner

*Primary Examiner*—David P Porta
*Assistant Examiner*—Casey Bryant
(74) *Attorney, Agent, or Firm*—Baker Botts L.L.P.

(57) ABSTRACT

A system for detecting explosive materials includes at least one deuterium/tritium neutron generator module, at least one germanium detector module, and an analysis module. The deuterium/tritium neutron generator module bombards an object with neutrons. The germanium detector module detects gamma rays emitted by the object in response to the neutrons. The analysis module analyzes the gamma rays detected by the germanium detector module for the presence of explosive materials on or within the object.

26 Claims, 3 Drawing Sheets

SYSTEM AND METHOD FOR DETECTING EXPLOSIVE MATERIALS

TECHNICAL FIELD

This invention relates generally to the field of detection systems and more specifically to system and method for detecting explosive materials.

BACKGROUND

Explosive detection systems may use non-destructive inspection processes to determine whether an object contains explosive material. Explosive detection systems may be used at airports, ports, or borders. Known detection systems may detect explosive material using radiation decay signatures. Explosive materials have similar ratios of carbon, hydrogen, nitrogen, and oxygen, which yield similar radiation decay signatures. These detection systems bombard an object with neutrons and detect the resulting radiation. The radiation decay signatures of the detected radiation are used to determine the chemical composition of material of the object.

SUMMARY OF THE DISCLOSURE

In accordance with the present invention, disadvantages and problems associated with previous techniques for detecting explosive materials may be reduced or eliminated.

According to one embodiment of the present invention, a system for detecting explosive materials includes at least one deuterium/tritium neutron generator module, at least one germanium detector module, and an analysis module. The deuterium/tritium neutron generator module bombards an object with neutrons. The germanium detector module detects gamma rays emitted by the object in response to the neutrons. The analysis module analyzes the gamma rays detected by the germanium detector module for the presence of explosive materials on or within the object.

Certain embodiments of the invention may provide one or more technical advantages. A technical advantage of one embodiment may be that a neutron generator bombards an object with neutrons, and gamma ray detectors detect the resulting radiation. The generator and detectors may move along the object in a synchronized manner to perform a continuous scan. Another technical advantage of one embodiment may be that an initial scan for oxygen may be performed. If an area with a higher concentration of oxygen is detected, then a confirming scan for an area with a higher concentration of nitrogen may be performed.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
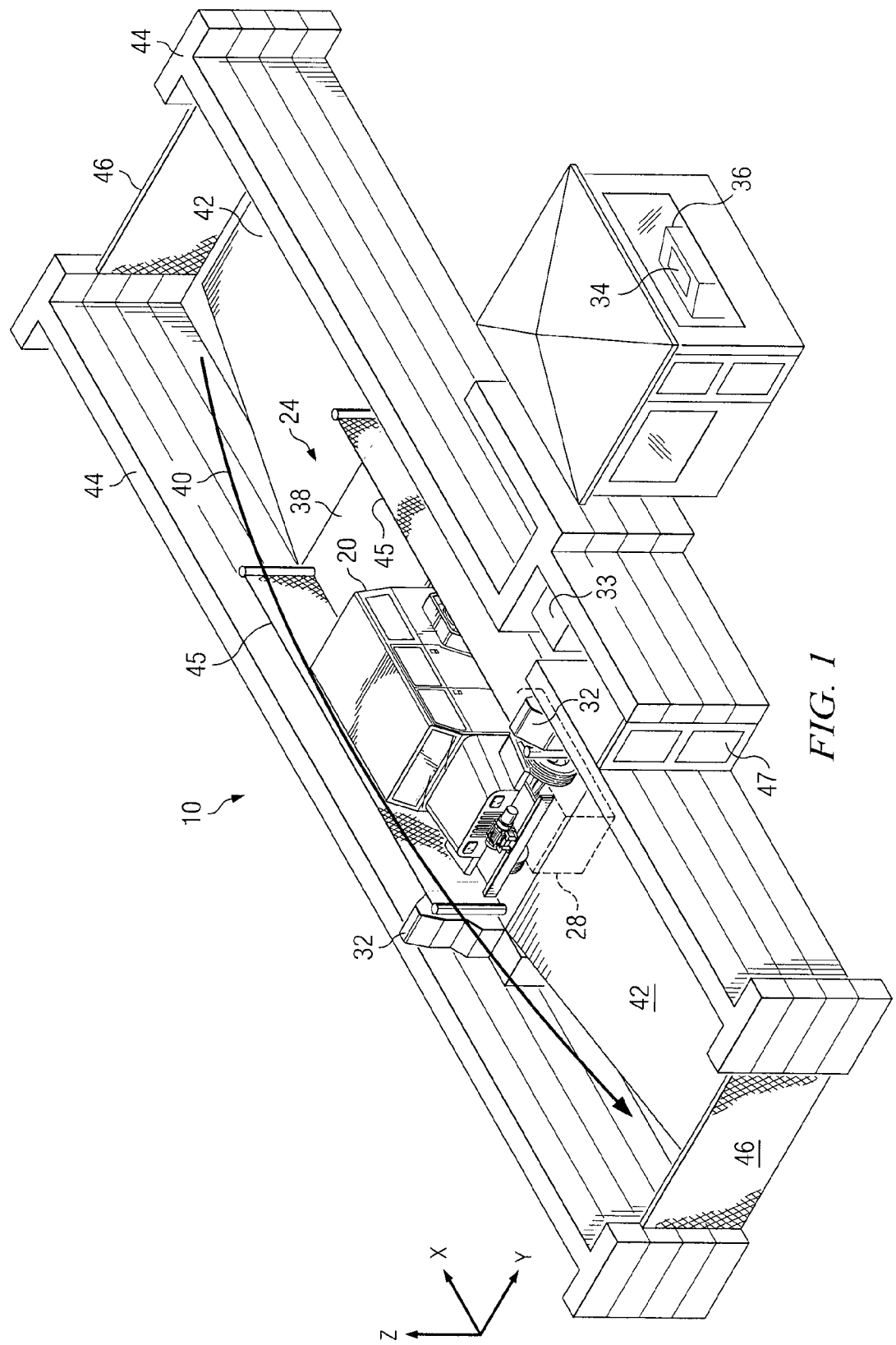
FIG. 1 illustrates one embodiment of an explosive detection system operable to detect explosive materials on an object.
Figure 2A:
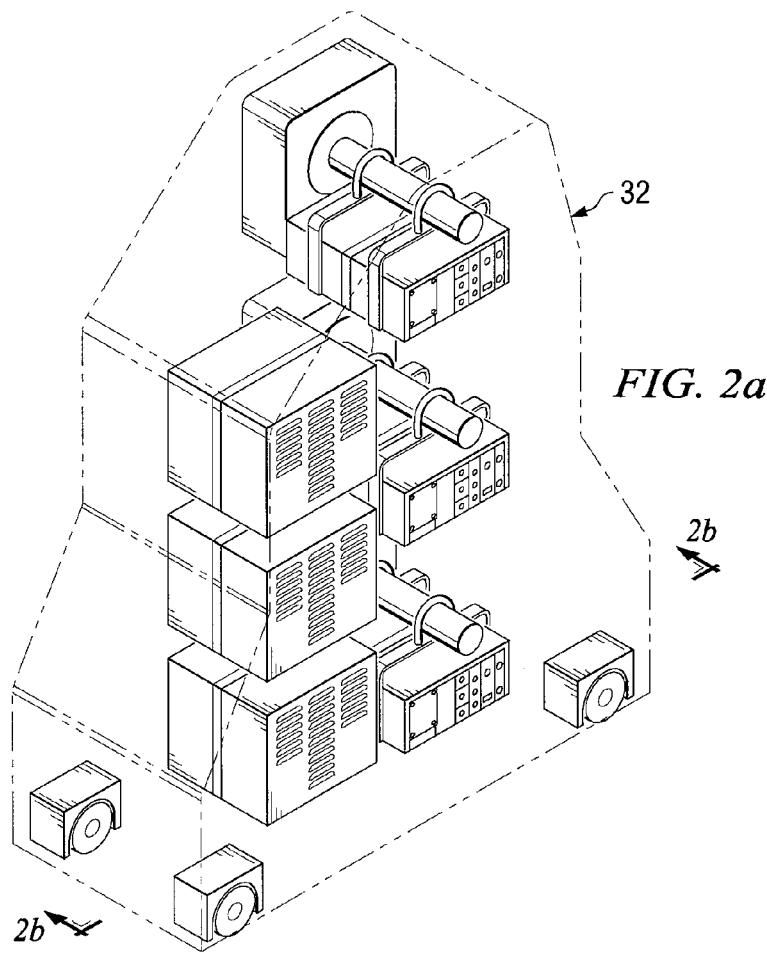
FIGS. 2A and 2B illustrate one embodiment of a gamma ray detector module that may be used with the system of FIG. 1.
Figure 2B:
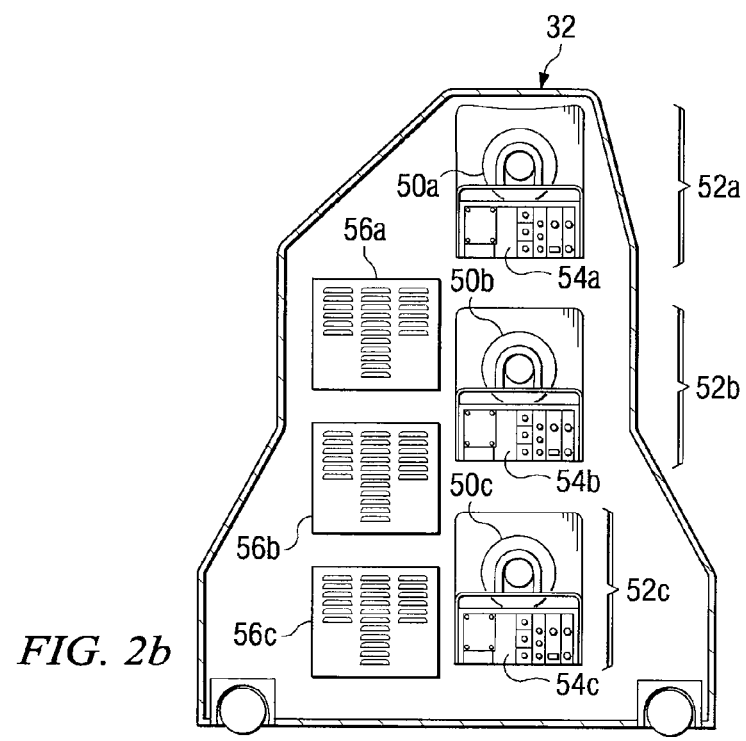
Figure 3:
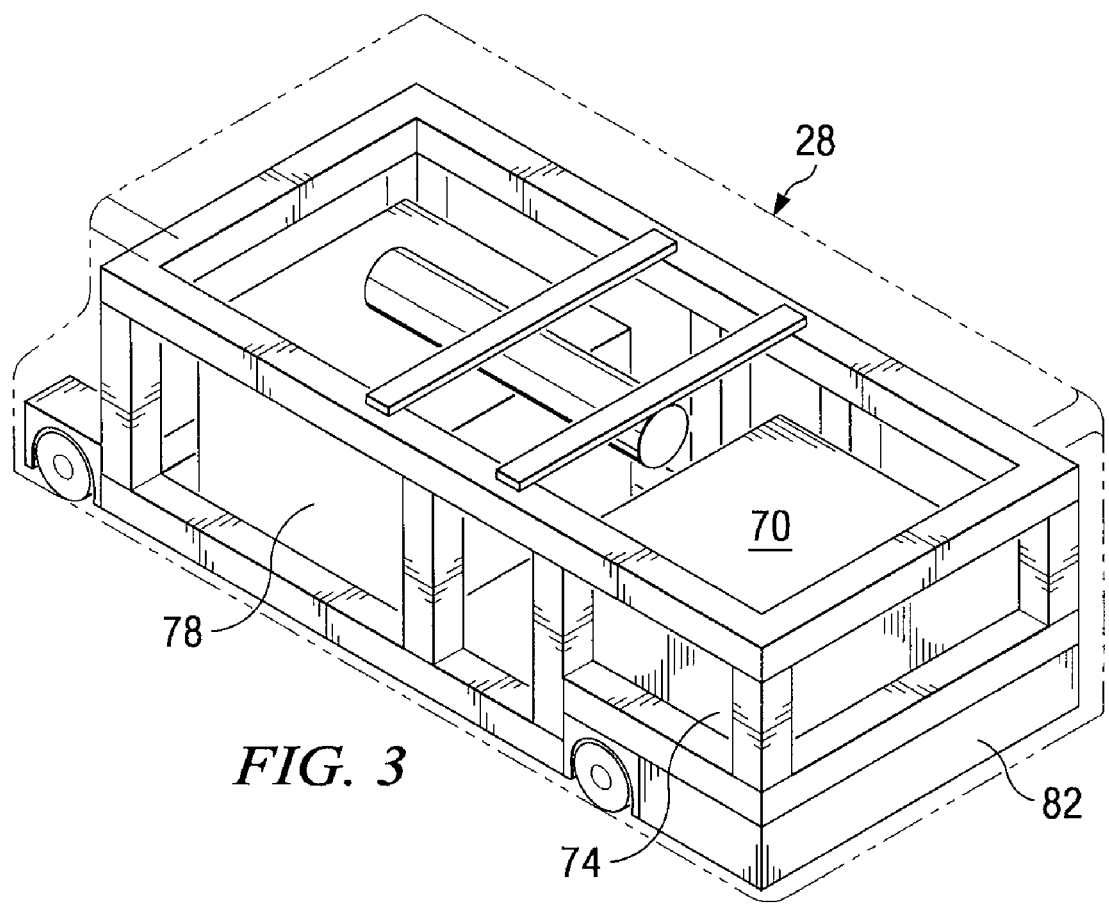
FIG. 3 illustrates one embodiment of a neutron generator that may be used with the system of FIG. 1.

Embodiments of the present invention and its advantages are best understood by referring to FIGS. 1 through 3 of the drawings, like numerals being used for like and corresponding parts of the various drawings.

FIG. 1 illustrates one embodiment of an explosive detection system 10 operable to detect explosive materials on an object 20. According to the embodiment, system 10 includes an interrogation area 24, one or more neutron generator modules 28, one, two, or more gamma ray detector modules 32, a console module 33, and an analysis module 34 located at an operator station 36.

In one example of operation, a user at operator station 36 may initiate an explosive detection process. Neutron generator module 28 bombards object 20 with neutrons. Gamma ray detector modules 32 detect gamma rays emitted by object 20 in response to the neutrons. Analysis module 34 analyzes the detected gamma rays for the presence of explosive materials on or within object 20. Neutron generator module 28 and gamma ray detector modules 32 may move in a synchronous manner relative at least one dimension of object 20. Explosive detection system 10 may be located at check points in areas such as airports, ports, toll booths, border crossings, or facility entrances.

According to one embodiment, object 20 is tested for the presence of explosive material. Examples of object 20 include a vehicle (such as a car, boat, or airplane), a container (such as a package, shipping container, or waste disposal container), or one or more other suitable solids or fluids.

An explosive material may refer to one or more materials that may produce an explosion, such as a mass detonating class 1.1 explosion. Examples of explosives include ethylene glycol dinitrate (EGDN), High Melting Explosive (HMX) (Octahydro-1,3,5,7-tetranitro-1,3,5,7-tetrazocine), pentaerythritol tetranitrate (PETN), Royal Demolition eXplosive (RDX) (Hexahydro-1,3,5-trinitro-1,3,5-triazine), Trinitrotoluene (TNT), ammonium nitrate and fuel oil (ANFO), urea nitrate, potassium chlorate ($KClO_3$), and/or triacetone triperoxide (TATP). Explosives may have any suitable embodiment, such as water gels, slurries, solids, sheets, and/or powder.

Interrogation area 24 may have any shape and size suitable for detecting explosive material in, at, or on object 20. Interrogation area 24 may be sufficiently large to allow neutron generator modules 28 and gamma ray detectors modules 32 to scan areas of interest of object 20. For example, if object 20 is a vehicle, interrogation area 24 may be approximately ten feet wide by eight feet tall by 30 feet long.

According to one embodiment, interrogation area 24 may include a detection area 38, a path 40, one or more ramps 42, shielding 44, and one or more screens 46. Detection area 38 may support object 20 during the detection process, and may have any size and shape suitable for supporting object 20. For example, elevated detection area 38 may have a rectangular shape less than 20 feet long and 15 feet wide, such as approximately ten feet long and ten feet wide, to accommodate a car. In one embodiment, detection area 38 may be elevated to allow generator module 28 to pass underneath object 20. For example, detection area 38 may be elevated less than five feet, such as approximately two feet.

Object 20 may travel along path 40 through interrogation area 24 to and from detection area 38. Ramps 42 may be used to facilitate movement of object 20 to an elevated detection area 38, and may have any size and shape suitable for facilitating movement of object 20. For example, a ramp 42 may have a rectangular shape less than 20 feet long and 15 feet wide, such as approximately ten feet long and ten feet wide, to accommodate a car.

Shielding 44 and screens 46 may surround interrogation area 24. Shielding 44 may decrease or prevent radiation from exiting interrogation area 24. Screen 46 may be used to prevent a next object 20 from entering interrogation area 24 and/or keep object 20 within interrogation area 24. Path 40, detection area 38, and ramp 42 may have a modular design that allows for separation and assembly of the components.

Neutron generator module 28 directs neutrons towards object 20, and may comprise a deuterium/tritium neutron generator that directs neutrons towards object 20. In one embodiment, neutron generator module 28 directs neutrons in a direction that is generally orthogonal to the direction in which a gamma ray detector module 32 detects radiation. In the illustrated embodiment, neutron generator module 28 may direct neutrons in the z-direction, while gamma ray detector module 32 detects radiation in the y-direction. In one embodiment, neutron generator module 28 may pass underneath detection area 38. An example of neutron generator module 28 is described in more detail with reference to FIG. 3.

Gamma ray detector module 32 detects gamma rays emitted by object 20. Detector module 32 may comprise one or more gamma ray detectors and optionally one or more digital spectrometers. Examples of gamma ray detectors include germanium detectors such as high purity germanium gamma detectors or bismuth germanate detectors. Detector modules 32 may be positioned on opposite sides of object 20. An example of detector module 32 is described in more detail with reference to FIGS. 2A and 2B.

According to one embodiment, neutron generator module 28 and gamma ray detector modules 32 may scan object 20 in a substantially synchronized manner. For example, when neutron generator module 28 is directing neutrons towards object 20, gamma ray detector modules 32 may be placed where modules 32 can detect the resulting radiation. Neutron generator module 28 and detector modules 32 may then move to another part of object 20. In the illustrated embodiment, modules 28 and 32 may move in the x-direction. According to one embodiment, the movement may be smooth and continuous.

Neutron generator module 28 and gamma ray detector modules 32 move relative to object 20. For example, generator module 28 and detector modules 32 may move while object 20 remains stationary. In another example, object 20 may move while generator module 28 and detector modules 32 remain stationary.

In one example, position sensors may detect when modules 28 and 32 reach the end of detection area 38. Examples of position sensors include photoelectric eyes, proximity sensors, and lever-actuated switches. When modules 28 and 32 reach the end of detection area, modules 28 and 32 may slide and stop, and may then move in the reverse direction.

Any suitable motion system may be used to move neutron generator module 28 and gamma ray detector modules 32. A motion system may include motors, a track system, and one or more position sensors. In one embodiment, a module 28 or 32 may be moved by a motor, such as a gear motor (for example, one-half horse power), along a track aligned in the x-direction. Position sensors may detect the position of modules 28 and/or 32, and may include, for example, photoelectric eyes. The position information may be sent to analysis module 34 using an optical encoder on the idler wheel of a module.

Console module 33 may perform any suitable operations to facilitate operation of system 10. For example, console module 33 may facilitate communication among the modules of system 10, may monitor and/or control position and/or movement of modules 28 and 32, may provide a visual and/or audio notification of a threat, and/or may manage electrical power usage.

Analysis module 34 analyzes the detected gamma rays for the presence of explosive materials. Analysis module 34 may determine the chemical composition of material of object 20 from the radiation decay signatures. Different signal strengths from different detector modules 32 may be used to determine the location of explosive material. Stronger signals may indicate closer proximity.

Operator station 36 may be located within or separated from interrogation area 24, and may communicate with other modules of system 10 using any suitable wired or wireless links. Operator station 36 may include a graphical user interface (GUI) such as a touch screen GUI. The GUI may include controls for initiating confirming scans, enabling neutron generator module 28, terminating a scan, and/or performing other suitable process. The GUI may display the status of the detection process, and may provide visual and/or audio notifications if explosive material is detected. In one embodiment, operator station 36 may be housed in a personnel enclosure that allows a user to operate system 10 in a protected area.

Scans may be performed in any suitable manner. For example, object 20 may be initially scanned to detect areas of object 20 with higher concentrations of oxygen than other areas. If higher concentrations of oxygen are detected, a confirming scan may be performed to detect areas of object 20 with higher concentrations of nitrogen than other areas. The confirming scan may be performed at suspect areas of object 20. The scans may take any suitable period of time, for example, an initial scan may take less than 25 seconds and a confirming scan may take less than 60 seconds.

According to one embodiment, a dual buffer system may be used. In the embodiment, radiation may be detected during a scan. Data from the scans may then be transferred to analysis module 34. One buffer may be used to store data collected during the scan, and another buffer may be used to transfer the data. Accordingly, the scanning may be performed in a substantially continuous manner.

Explosive detection system 10 may include safety features. For example, light screens 45 may be used to align object 20. Emergency stop buttons and/or pull cords may be activated to automatically shut down radiation. For example, emergency stop buttons may be placed near the entrance and exit of interrogation area 24, and/or emergency stop pull cords may be placed along path 40. A secondary neutron detector may be used to detect unintended neutron release. Position sensors, for example, photoelectric eyes, may be used to notify object 20 when to stop. Gate 47 may have positive interlocking doors to protect personnel.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component.

Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. For example, the operations of console module 33 and analysis module 34 may be performed by one component, or the operations of analysis module 34 may be performed by more than one component. Additionally, operations of system 10 may be performed using any suitable logic comprising software, hardware, other logic, or any suitable combination of the preceding. As used in this document, "each" refers to each member of a set or each member of a subset of a set.

FIGS. 2A and 2B illustrate one embodiment of a gamma ray detector module 32 that may be used with the system 10 of FIG. 1. According to the illustrated embodiment, detector module 32 may include a detector subsystem 52. A detector subsystem 52 may include a gamma ray detector 50, a detector cooler 56, and a digital spectrometer 54. Gamma ray detector 50 may be, for example, a gamma ray germanium detector. Detector cooler 56 may cool detector 50 during operation when detector 50 may generate heat. Digital spectrometer 54 may generate a spectrum from the detected gamma rays. The spectrum may indicate elements detected by detector 50.

FIG. 3 illustrates one embodiment of a neutron generator 28 that may be used with system 10 of FIG. 1. According to the illustrated embodiment, neutron generator module 28 includes a neutron generator 70, a passive reflector 74, and a control chassis 78. Neutron generator 70 may comprise, for example, a neutron generator operable to generate neutrons of energy (14 MeV). Reflector 74 reflects neutrons in the direction of object 20. Control chassis 78 houses neutron generator module 28. Shielding 82 reduces or prevents neutrons from traveling in unintended directions.

Certain embodiments of the invention may provide one or more technical advantages. A technical advantage of one embodiment may be that a neutron generator bombards an object with neutrons, and gamma ray detectors detect the resulting radiation. The generator and detectors may move along the object in a synchronized manner to perform a continuous scan. Another technical advantage of one embodiment may be that an initial scan for oxygen may be performed. If an area with a higher concentration of oxygen is detected, then a confirming scan for an area with a higher concentration of nitrogen may be performed.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system for detecting explosive materials, comprising:
   at least one neutron generator module operable to bombard an object with neutrons;
   at least one gamma ray detector module operable to detect gamma rays emitted by the object in response to the neutrons; and
   an analysis module operable to analyze the gamma rays detected by the at least one gamma ray detector module for the presence of explosive materials on or within the object;
   wherein the at least neutron generator module and at least one gamma ray detector module are operable to move in a substantially synchronized manner relative to at least one dimension of the object;
   wherein the analysis module is operable to analyze the gamma rays detected by the at least one gamma ray detector module for an area with a higher concentration of oxygen; and
   wherein the analysis module is further operable to analyze the gamma rays detected by the at least one gamma ray detector module for an area with a higher concentration of nitrogen in response to detecting an area with a higher concentration of oxygen.

2. The system of claim 1, wherein the at least one neutron generator module is positioned orthogonally to the at least one gamma ray detector module.

3. The system of claim 1, wherein the at least one neutron generator module is configured to pass underneath the object.

4. The system of claim 1, wherein the at least one gamma ray detector module is configured to pass alongside the object.

5. The system of claim 1, wherein the at least one gamma ray detector module comprises two gamma ray detectors positioned on opposite sides of the object.

6. The system of claim 1, wherein the neutron generator module comprises a deuterium/tritium neutron generator.

7. The system of claim 1, wherein the at least one gamma ray detector module comprises at least one gamma ray detector.

8. The system of claim 7, wherein the at least one gamma ray detector comprises a germanium detector.

9. The system of claim 1, wherein the at least one gamma ray detector module comprises one or more digital spectrometers.

10. The system of claim 1, wherein the object comprises a vehicle.

11. A method of detecting explosive materials, comprising:
    moving at least one neutron generator module and at least one gamma ray detector module in a substantially synchronized manner relative to at least one dimension of an object;
    bombarding the object with neutrons generated by the at least one neutron generator module;
    detecting gamma rays emitted by the object in response to the neutrons with the at least one gamma ray detector module;
    analyzing the gamma rays emitted by the object for an area with a higher concentration of oxygen; and
    analyzing the gamma rays for an area with a higher concentration of nitrogen in response to detecting an area with a higher concentration of oxygen.

12. The method of claim 11, wherein the at least one neutron generator module is positioned orthogonally to the at least one gamma ray detector module.

13. The method of claim 11, wherein the at least one neutron generator module is configured to pass underneath the object.

14. The method of claim 11, wherein the at least one gamma ray detector module is configured to pass alongside the object.

15. The method of claim 11, wherein the at least one gamma ray detector module comprises two gamma ray detectors positioned on opposite sides of the object.

16. The method of claim 11, wherein the at least one neutron generator module comprises a deuterium/tritium neutron generator.

17. The method of claim 11, wherein the at least one gamma ray detector module comprises at least one gamma ray detector.

18. The method of claim 17, wherein the at least one gamma ray detector module comprises a germanium detector.

19. The method of claim 11, wherein the at least one gamma ray detector module comprises one or more digital spectrometers.

20. The method of claim 11, wherein the object comprises a vehicle.

21. A system for detecting explosive materials, comprising:
   at least one deuterium/tritium neutron generator module operable to bombard an object with neutrons;
   at least one germanium detector module operable to detect gamma rays emitted by the object in response to the neutrons; and
   an analysis module operable to analyze the gamma rays detected by the at least one germanium detector module for the presence of explosive materials on or within the object;
   wherein the analysis module is operable to analyze the gamma rays detected by the at least one germanium detector module for a high concentration of oxygen; and
   wherein the analysis module is further operable to analyze the gamma rays detected by the at least one germanium detector module for a high concentration of nitrogen in response to detecting a high concentration of oxygen.

22. The system of claim 21, wherein the at least one deuterium/tritium neutron generator module is positioned orthogonally to the at least one germanium detector module.

23. The system of claim 21, wherein the at least one deuterium/tritium neutron generator module is configured to pass underneath the object and the at least one germanium detector module is configured to pass alongside the object.

24. A method of detecting explosive materials, comprising:
   bombarding an object with neutrons generated by a deuterium/tritium neutron generator module;
   detecting gamma rays emitted by the object in response to the neutrons at a gamma ray detector module;
   analyzing the gamma rays emitted by the object for a high concentration of oxygen; and
   analyzing the gamma rays for a high concentration of nitrogen in response to detecting a high concentration of oxygen.

25. The method of claim 24, wherein the deuterium/tritium neutron generator module is positioned orthogonally to the gamma ray detector module.

26. The method of claim 24, further comprising:
   passing the deuterium/tritium neutron generator module underneath the object; and
   passing the gamma ray detector module alongside the object.

* * * * *